July 26, 1960     G. L. COLSON     2,946,242
REVERSING FRICTION DRIVE

Filed Feb. 3, 1959     2 Sheets-Sheet 1

Glenn L. Colson
INVENTOR.

BY *Clarence A. O'Brien*
*and Harvey B. Jackson*
                                 Attorneys July 26, 1960

G. L. COLSON 2,946,242

REVERSING FRICTION DRIVE

Filed Feb. 3, 1959

Glenn L. Colson
INVENTOR.

BY

2,946,242
REVERSING FRICTION DRIVE
Glenn L. Colson, 1531 Wedgewood Drive, Lawrence, Kans.

Filed Feb. 3, 1959, Ser. No. 790,932

3 Claims. (Cl. 74—792)

This invention relates to power operated tools and more particularly to a reversing friction chuck providing an improved method of driving or extracting screws, taps, bolts, lag screws or bolts and many other fasteners that require variable speed and torsion.

An object of the invention is to provide a reversing friction chuck adapted to be actuated by a power tool, for instance an electric hand drill, whereby there is an improved action over electric impact wrenches which exert full and constant power and then added power by inertia, for example a hammer blow.

Another object of the invention is to provide a device which is capable of exerting any force throughout the limits of zero and maximum available by the use of a friction clutch which is easily operated. Further, there are means in the device for reversing the direction of rotation of the power output shaft in the chuck so that either a clockwise or counterclockwise directional force is available at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In the accompanying drawings there is shown a conventional electric hand drill 10 having a conventional chuck 12. The chuck has tang 14 of shaft 16 tightly engaged in it thereby drivingly connecting shaft 16 with the hand drill.

Figure 4:
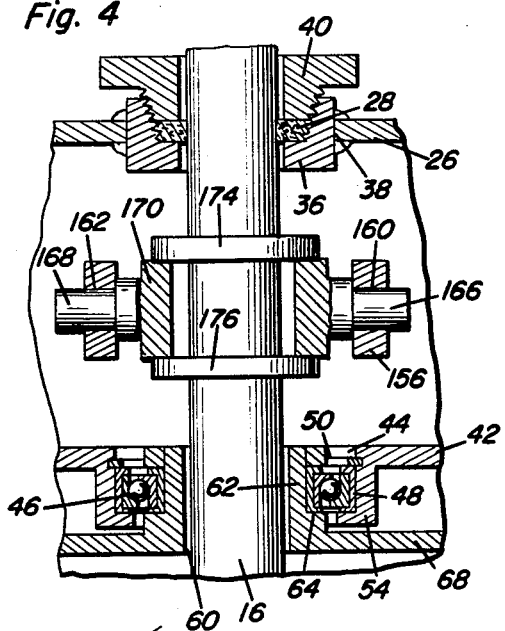
Figure 4 is an enlarged fragmentary sectional view taken on line 4—4 of Figure 2.

The reversing friction chuck 18 is made of a housing 20 preferably having a cylindrical side wall 22, a lower wall 24 and an upper wall 26. Shaft 16 extends through packing gland 28 located in an opening of wall 26. Walls 24 and 26 are separably attached to the side wall 22 of the housing, for instance they may have a threaded collar 34 connected to a threaded part of wall 22. Packing gland 28 consists of a retainer 36 welded or otherwise secured in the opening 38 in top wall 26 together with an upper container 40 that is threaded in the lower retainer 36. Packing material is located between retainers 36 and 40 and held compressed against the shaft 16 by tightening the adjustable retainer 40, (Figure 4).

Housing 20 is horizontally subdivided by partition 42, the latter being welded or otherwise secured within the housing. There is a central opening 44 in the partition 42 to accommodate thrust bearing 46. The thrust bearing is an antifriction bearing having a pair of races with balls or rollers therebetween and located in a bearing cage 48. Retainer ring 50 is located in a groove at the upper part of a bearing supporting collar 54 at the periphery of opening 44 in partition wall 42. As seen in Figure 4 the shaft 16 extends through a central bore 60 that is formed in a sleeve 62, the latter extending vertically upward and having a shoulder 64 on which a part of the antifriction bearing cage 48 is disposed. Sleeve 62 is fixed to upper wall 68 of a clutch mechanism 70 located beneath thrust bearing 46 and above the wall 24 of housing 20.

The clutch mechanism is composed of a cylinder 72 which depends from wall 68. A conical clutch member or element 76 is attached to wall 72, e.g. by bolts 78, and is disposed at the upper end of the clutch mechanism. Clutch element 76 has a truncated conical cavity 80 therein. Clutch element 82 cooperates with clutch element 76 and also with clutch element 84. It is located in the cavity 80 and is fixed to the lower end of shaft 16, so that it is the rotating power application member of the clutch. Clutch element 82 has an outer clutch surface 86 and an inner clutch surface 88, the outer clutch surface coacting with clutch element 76 and the inner surface 88 coacting with clutch element 84. This element 84 is in the shape of a truncated cone and fits within the cavity enclosed by clutch element 82.

Figure 2:
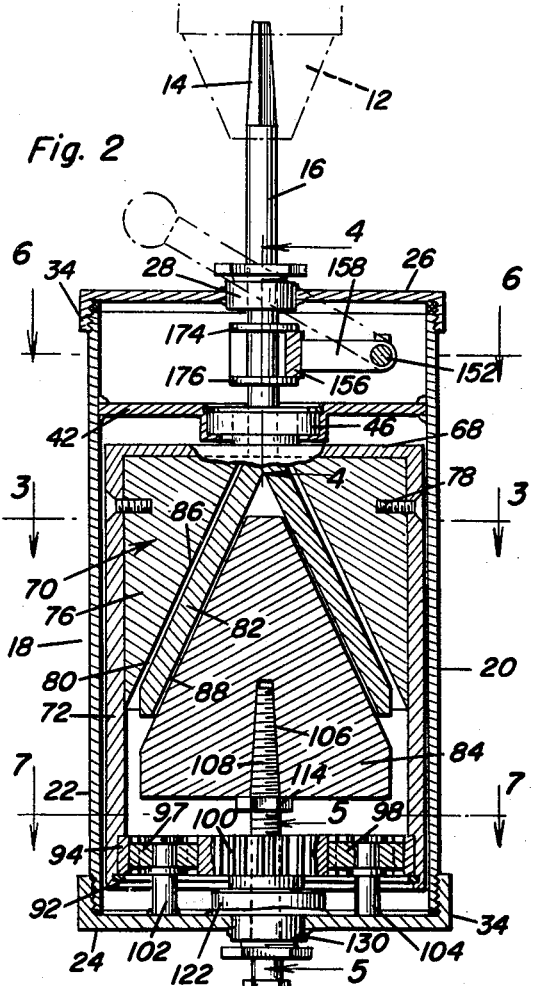
Figure 2 is a sectional view on an enlarged scale and taken on line 2—2 of Figure 1.
Figure 3:
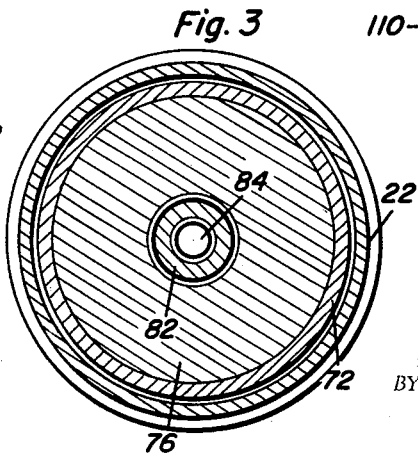
Figure 3 is a transverse sectional view taken on line 3—3 of Figure 2.

The lower end of wall 72 is open and has a retainer ring 92 located in an annular groove near the extreme end of this wall. Ring 92 maintains ring gear 94 in place along the inside circumference of wall 72. Two or more pinions 97 and 98 are located within the internally toothed ring gear and are enmeshed with it. They are also enmeshed with a larger gear 100 at the center of rotation of the ring gear 94. Pinions 97 and 98 are mounted for rotation on fixed spindles 102 and 104 attached at their lower ends to wall 24 (Figure 2).

Clutch element 84 has a threaded bore 106 within which threaded stem 108 of shaft 110 is fixed and held by lock nut 114. Gear 100 is also fixed to shaft 110, for instance by setscrew 118 (Figure 5) so that the shaft 110 may be removed from gear 100 so as to replace the shaft when a different size or character of tool is required.

Figure 5:
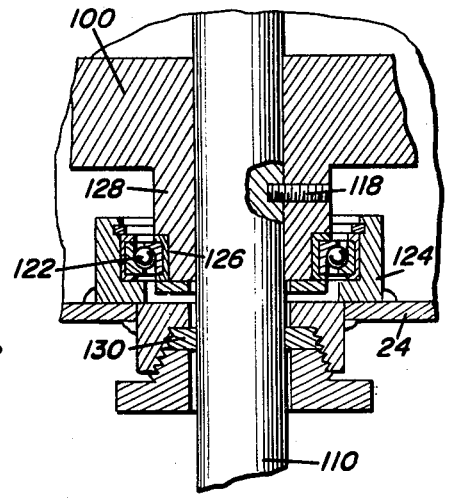
Figure 5 is an enlarged sectional view taken on line 5—5 of Figure 2.
Figure 8:
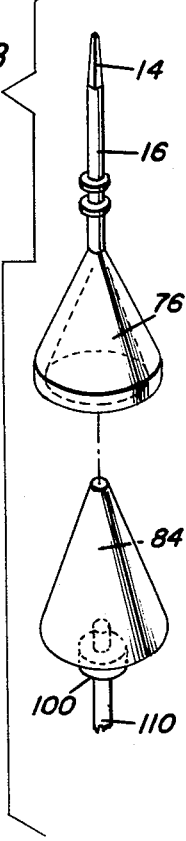
Figure 8 is an exploded perspective view of the clutch and shafts connected with the clutch used in the chuck.

Lower thrust bearing 122 is operatively connected with gear 100 (Figure 5). The antifriction thrust bearing 122 is conventional and is the same as thrust bearing 46. It is seated in a bearing retainer 124 welded or otherwise fixed to wall 24 and also seats in an annular recess 126 of collar 128 on gear 100. Packing gland 130 which is identical to packing gland 28, is connected in registry with an opening in wall 24 and has shaft 110 passed therethrough.

There are means for shifting the position of clutch element 82 so that it is drivingly connected with clutch element 76 or drivingly connected with clutch element 84. The different positions will cause power to be transmitted from shaft 16 to shaft 110 in a clockwise or counter-clockwise direction depending on the position of the clutch element 82. When engaged with clutch element 76, clutch element 82 drives shaft 110 by rotating ring gear 94 and causing the pinions 97 and 98 to drive gear 100. But when the elements 82 and 84 are in engagement, the drive is direct from the element 84 to the shaft 100 with the gears 100, 97, 98 and 94 simply idling with clutch element 76.

Figure 1:
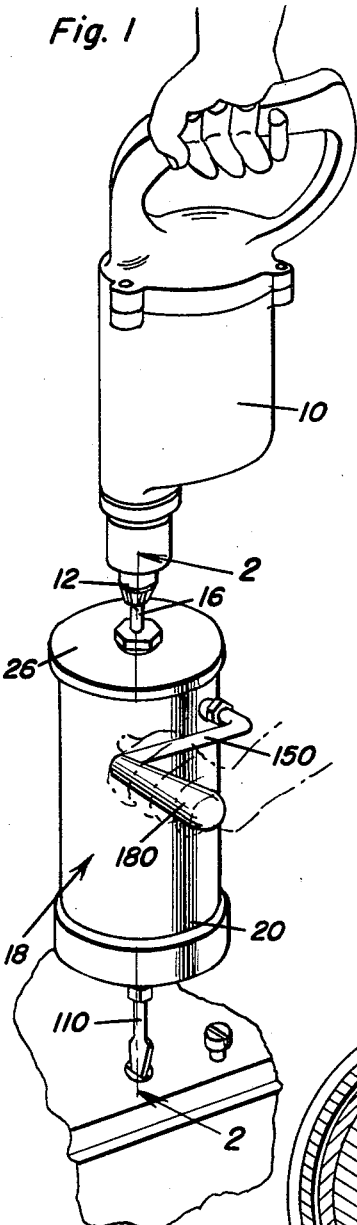
Figure 1 is a perspective view of the reversing friction chuck showing it in use.
Figure 9:
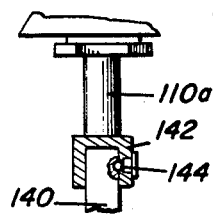
Figure 9 is a fragmentary elevational view, parts being in section and showing a chuck modification.

Reference to Figure 9 shows an embodiment of the invention which differs from the embodiment shown in the other figures by having an extension 140 separably connected by and engaged with socket 142 on the lower extremity of shaft 110a. A detent 144 or some other quick disconnect fastener may be used to attach the extension 140 in place. Figures 1 and 2 show a screw driver tang 137 at the lower extremity of shaft 110. In the embodiments of Figures 1 and 9, the screw driver tang may be substituted by a socket wrench socket, a Philips head screw driver tang or any and all other suitable tools. Regardless of the type of tool at the extremity of shaft 110, the power may be applied to the shaft and the tool thereon in either direction or with a selected amount of force, the selection being achieved by the amount of slippage allowed between the clutch elements.

Figure 6:
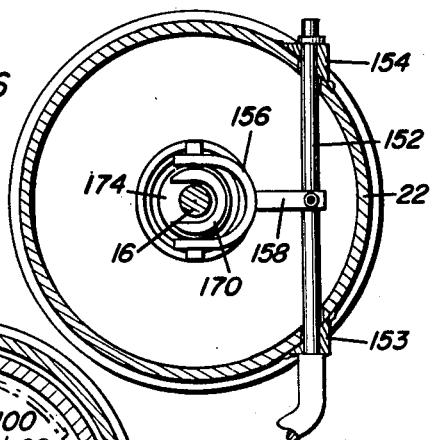
Figure 6 is a transverse sectional view taken on a line 6—6 of Figure 2.
Figure 7:
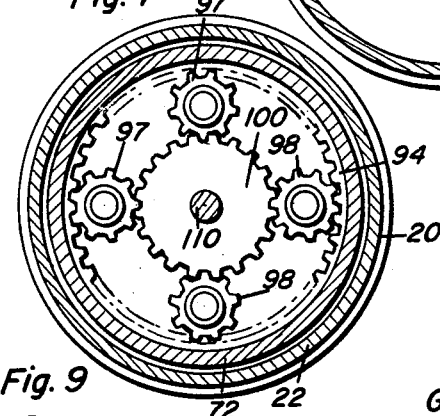
Figure 7 is a transverse sectional view taken on line 7—7 of Figure 2.

Since slippage is permitted, the shift for clutch element 82 is achieved by an easily manipulable crank 150 (Figures 6 and 1) which has a shaft 152 at one end. The shaft is mounted for rotation in bearings 153 and 154 fixed to wall 22 and diametrically opposed to each other. A fork 156 is at the end of arm 158, the arm being attached to shaft 152 intermediate its ends. The fork has a pair of spaced apertures 160 and 162 (Figure 4) in which trunnions 166 and 168 are mounted rotatably. A horeshoe collar 170 has the trunnions 166 and 168 fixed to the sides thereof, and the horseshoe collar is disposed between a pair of spaced collars 174 and 176 that are fixed to shaft 16. It is now evident as the handle grip 180 on crank 150 is oscillated, the yoke 156 and collar 170 elevate shaft 16 or lower the shaft in order to engage clutch element 82 with a selected clutch element 76 or 84 and with the amount of pressure between the clutch elements determined as proper by the user of the reversing friction chuck. Further, grip 180 provides the means for manually holding the housing 20 against rotation so that a drive may be established through the planetary gearing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A power hand tool reversing friction chuck for use with an electric power source, said chuck comprising a housing, a first shaft having an end in said housing and an end adapted to connect with the power source for rotation thereby, a driven power take-off shaft in said housing and axially aligned with said first shaft, a clutch assembly having a first clutch element, a second clutch element and a third clutch element respectively, means connecting said first clutch element to said driven shaft, means connecting said third clutch element to said driven shaft and including a reversing gear assembly, means including a hand crank projecting laterally from said housing and movably connected with said first shaft for moving said second clutch element into frictional contact with said first and said third clutch elements respectively to drive said driven shaft in the clockwise and selectively the counter-clockwise directions, each of said clutch elements having a conical surface and being friction clutch elements so that controlled slippage between clutch elements operates the power take-off shaft with a selected torque, said means including reversing gearing having at least one pinion, means fixed to said housing mounting said pinion for rotation, a gear separably attached to said power take-off shaft and engaged with said pinion so that said second shaft which is a tool driver shaft may be removed and replaced, a ring gear engaged with said pinion, and structural means attached to said ring gear and to said first clutch element connecting said ring gear for movement with said first clutch element.

2. A power hand tool reversing friction chuck for use with an electric power source, said chuck comprising a housing, a first shaft having an end in said housing and an end adapted to connect with the power source for rotation thereby, a driven power take-off shaft in said housing and a clutch assembly having a first clutch element, a second clutch element and a third clutch element respectively, means connecting said first clutch element to said driven shaft, means connecting said third clutch element to said driven shaft and including a reversing gear assembly, and means connected with said first shaft for moving said second clutch element into frictional contact with said first and said third clutch elements respectively to drive said driven shaft in the clockwise and selectively the counter-clockwise directions, each of said clutch elements having a conical surface and being friction clutch elements so that controlled slippage between clutch elements operates the power take-off shaft with a selected torque, a partition in said housing, said means for shifting the position of said second clutch element located on one side of said partition and including a crank which has a handle part on the exterior of said housing and a yoke on the interior of said housing, spaced discs attached to said first shaft and engaged by said yoke for axially sliding said first shaft with respect to said housing in response to oscillation of said handle part, said clutch mechanism located on the side of said partition opposite to the side having said yoke, and a thrust bearing connected with said partition through which said first shaft extends and against which one of said clutch elements react.

3. A power hand tool reversing friction chuck for use with an electric power source, said chuck comprising a housing, a first shaft having an end in said housing and an end adapted to connect with the power source for rotation thereby, a driven power take-off shaft in said housing and a clutch assembly having a first clutch element, a second clutch element and a third clutch element respectively, means connecting said first clutch element to said driven shaft, means connecting said third clutch element to said driven shaft and including a reversing gear assembly, and means connected with said first shaft for moving said second clutch element into frictional contact with said first and said third clutch elements respectively to drive said driven shaft in the clockwise and selectively the counter-clockwise directions, each of said clutch elements having a conical surface and being friction clutch elements so that controlled slippage between clutch elements operates the power take-off shaft with a selected torque, a partition in said housing, said means for shifting the position of said second clutch element located on one side of said partition and including a crank which has a part on the exterior of said housing and a part on the interior of said housing, said part on the exterior of said housing having a grip adapted to be manually held to hold said housing against rotation and to be moved to shift the position of said crank, said part on the interior of said housing operatively connected with said first shaft for axially sliding said first shaft with respect to said housing, said clutch mechanism located on the side of said partition opposite to the side having said crank part, and means at the extremity of said power take-off shaft for engaging a fastener to drive the fastener in the clockwise or counter-clockwise directions.

References Cited in the file of this patent

UNITED STATES PATENTS

| | | |
|---|---|---|
| 1,846,879 | Kurth | Feb. 23, 1932 |
| 2,141,209 | Emrick | Dec. 27, 1938 |
| 2,390,582 | Gohlke | Dec. 11, 1945 |
| 2,804,779 | Bergstedt | Sept. 3, 1957 |